United States Patent
Weicker

(10) Patent No.: US 10,538,170 B2
(45) Date of Patent: Jan. 21, 2020

(54) BATTERY MODULE COMMUNICATION LINK CONNECTION WITH IMPROVED SEALING

(71) Applicant: Faraday & Future Inc., Gardena, CA (US)

(72) Inventor: Phillip John Weicker, Los Angeles, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 598 days.

(21) Appl. No.: 15/226,277

(22) Filed: Aug. 2, 2016

(65) Prior Publication Data

US 2018/0037134 A1 Feb. 8, 2018

(51) Int. Cl.
*B60L 50/60* (2019.01)
*H01M 10/42* (2006.01)

(52) U.S. Cl.
CPC ..... *B60L 50/66* (2019.02); *H01M 2010/4271* (2013.01); *H01M 2010/4278* (2013.01); *H01M 2220/20* (2013.01)

(58) Field of Classification Search
CPC .. H02J 7/025; H02J 50/10; H02J 50/12; H02J 50/40; H02J 5/005; B60L 15/60; B60L 50/51; B60L 50/66; B60L 50/50; B60L 50/64
USPC ................................................ 307/10.1, 107
See application file for complete search history.

(56) References Cited

U.S. PATENT DOCUMENTS

| | | | | |
|---|---|---|---|---|
| 7,863,859 B2 * | 1/2011 | Soar | ........................ | F41H 1/02 320/108 |
| 7,994,752 B2 * | 8/2011 | Soar | ..................... | H01F 27/365 320/108 |
| 8,362,743 B2 * | 1/2013 | Andrieu | ................ | H01F 7/0247 320/108 |
| 8,571,746 B2 * | 10/2013 | Tippelt | .................. | B60R 16/027 307/10.2 |
| 2008/0296978 A1 * | 12/2008 | Finkenzeller | ........ | G06K 7/0008 307/104 |
| 2011/0260681 A1 * | 10/2011 | Guccione | .............. | H02J 7/0054 320/108 |
| 2017/0373522 A1 * | 12/2017 | Pelosi | ................... | H02J 7/0021 |

OTHER PUBLICATIONS

Munson, Jon, "Boost battery mgmt systems with isoSPI data links," *EE Times-India* | eetindia.com, pp. 1-4, 2013.
Munson, Jon, "Low Cost isoSPI Coupling Circuitry for High Voltage High Capacity Battery Systems," *LT Journal of Analog Innovation*, Apr. 2014, pp. 26-29.

* cited by examiner

*Primary Examiner* — John W Poos
(74) *Attorney, Agent, or Firm* — Knobbe Martens & Bear LLP

(57) ABSTRACT

Battery module communication system with improved enclosure sealing is disclosed. When applied to an electric vehicle, a battery data communication system disclosed herein includes module enclosures having partial transformers, such as coils, contained inside the enclosures having inter-module interfaces. The inter-module interfaces can engage with one another to form transformers without the module enclosures having wire holes to connect data communication circuits contained in the respective module enclosures.

14 Claims, 8 Drawing Sheets

BATTERY MODULE COMMUNICATION LINK CONNECTION WITH IMPROVED SEALING

BACKGROUND

Field

The described technology generally relates to electric vehicles, more specifically, to batteries.

Description of the Related Art

Various subsystems of an electric vehicle can be in communication with one another, and parts of the subsystems can be mechanically enclosed or housed. Wired data communication between mechanically enclosed or housed subsystems can be challenging as the wired communication may necessitate breaking mechanical isolation of the various subsystems with specific piercing, puncturing, and/or sealing techniques and materials.

SUMMARY

The methods and devices of the described technology each have several aspects, no single one of which is solely responsible for its desirable attributes.

In one implementation, an electric vehicle includes a first battery module in a first housing, a second battery module in a second housing, a first coil proximate to and inside of the first housing, and a second coil proximate to and inside of the second housing, wherein the first coil forms a primary winding of a transformer and the second coil forms a secondary winding of the transformer.

In another implementation, an electric vehicle includes a plurality of battery modules each in respective plurality of housings, wherein each of the plurality of housings includes at least one coil forming either a primary winding or a secondary winding of a transformer, wherein the plurality of housings are placed adjacent to one another so as to form a plurality of transformers from the respective coils of the adjacent housings.

In another implementation, a method of making one or more communication links between a plurality of housings each containing a battery module includes forming at least first interface associated with a coil for at least one of the plurality of housings, forming at least second interface associated with a coil for at least another one of the plurality of housings, and engaging the at least first interface and the at least second interface of the different housings to form at least one transformer.

BRIEF DESCRIPTION OF THE DRAWINGS

These drawings and the associated description herein are provided to illustrate specific embodiments of the invention and are not intended to be limiting.

DETAILED DESCRIPTION

Figure 1:
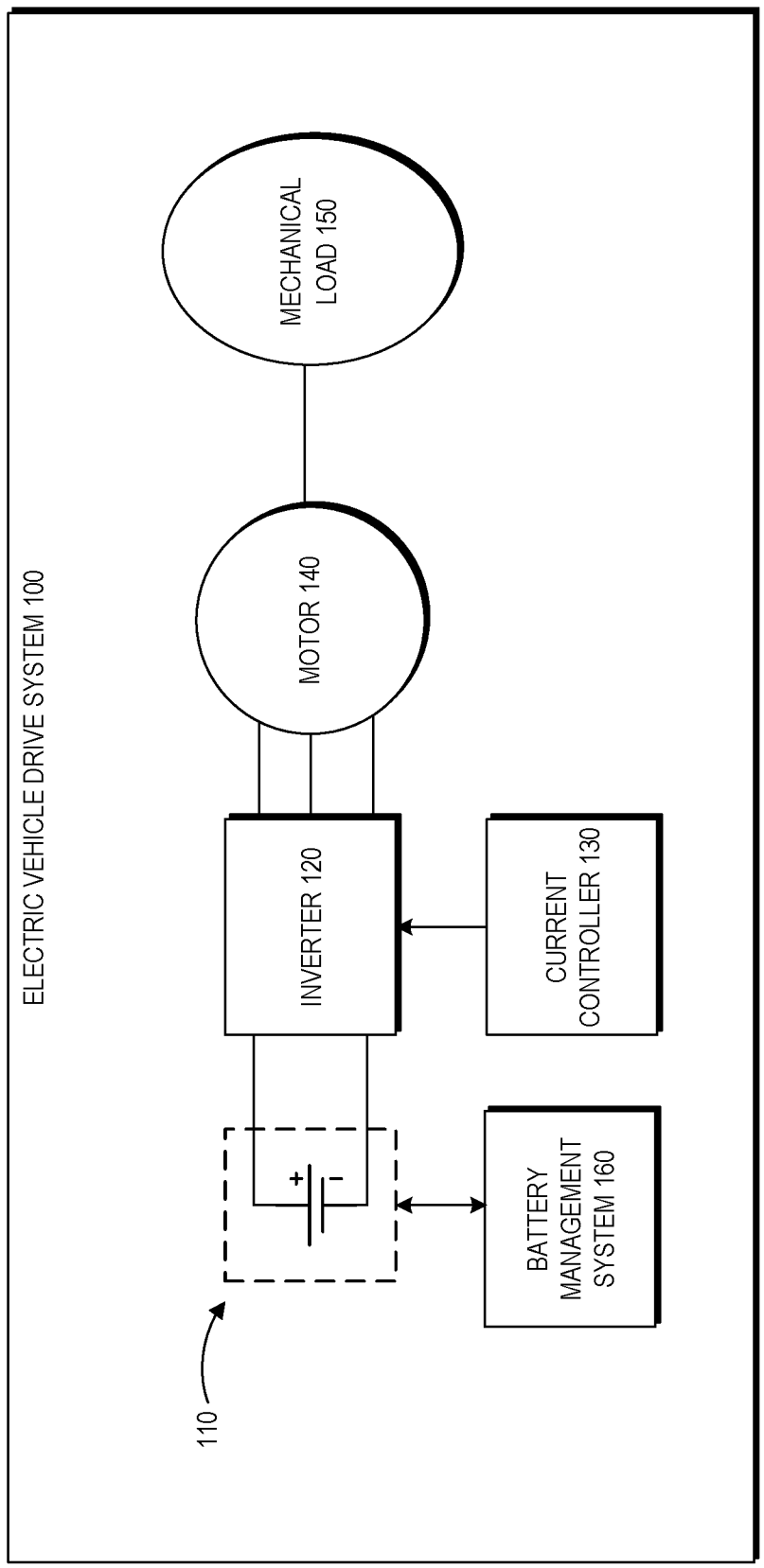
FIG. 1 is a block diagram of an example electric vehicle drive system according to one embodiment

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to automotive systems and/or different wired and wireless technologies, system configurations, networks, including optical networks, hard disks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Battery module communication system with improved enclosure sealing is disclosed. When applied to an electric vehicle, a battery data communication system disclosed herein includes module enclosures having partial transformers, such as coils, contained inside the enclosures having inter-module interfaces. The inter-module interfaces can engage with one another to form transformers without the module enclosures having wire holes to connect data communication circuits contained in the respective module enclosures.

FIG. 1 is a block diagram of an example electric vehicle drive system 100. The electric vehicle drive system 100 includes the battery or voltage source 110, an inverter 120 coupled to the battery 110, a current controller 130, a motor 140, and mechanical load 150, and a battery management system 160. The battery 110 can be a single phase direct current (DC) source. In some embodiments, the battery 110 can be a rechargeable electric vehicle battery or traction battery used to power the propulsion of an electric vehicle including the drive system 100. Although the battery 110 is illustrated as a single element in FIG. 1, the battery 110 depicted in FIG. 1 is only representational, and further details of the battery 110 are discussed below in connection with FIGS. 2-3.

The inverter 120 includes power inputs which are connected to conductors of the battery 110 to receive, for example, DC power, single-phase electrical current, or multi-phase electrical current. Additionally, the inverter 120 includes an input which is coupled to an output of the current controller 130. The illustrated inverter 120 also includes three outputs representing three phases with currents that can be separated by 120 electrical degrees, with each phase provided on a conductor coupled to the motor 140. It should be noted that in other embodiments inverter 120 may produce greater or fewer than three phases.

The motor 140 is fed from voltage source inverter 120 controlled by the current controller 130. The inputs of the motor 140 are coupled to respective windings distributed about a stator. The motor 140 can be coupled to a mechanical output, for example a mechanical coupling between the motor 140 and the mechanical load 150. The mechanical load 150 may represent one or more wheels of the electric vehicle.

The current controller 130 can be used to generate gate signals for the inverter 120. Accordingly, control of vehicle speed is performed by regulating the voltage or the flow of current from the inverter 120 through the stator of the motor 140. There are many control schemes that can be used in the electric vehicle drive system 100 including current control, voltage control, and direct torque control. Selection of the characteristics of the inverter 120 and selection of the control technique of the current controller 130 can determine efficacy of the drive system 100. The battery management system 160 can receive data from the battery 110 and generate control signals to manage the battery 110. Further details of the battery management system 160 are discussed in connection with FIGS. 2-3 below.

Although not illustrated, the electric vehicle drive system 100 can include one or more position sensors for determining position of the rotor of the motor 140 and providing this information to the current controller 130. For example, the motor 140 can include a signal output that can transmit a position of a rotor assembly of the motor 140 with respect to the stator assembly motor 140. The position sensor can be, for example, a Hall-effect sensor, a magnetoresistive sensor, potentiometer, linear variable differential transformer, optical encoder, position resolver, or other suitable sensor. In other embodiments, the saliency exhibited by the motor 140 can also allow for sensorless control applications. Although not illustrated in FIG. 1, the electric vehicle drive system 100 can include one or more current sensors for determining phase currents of the stator windings and providing this information to the current controller 130. The current sensor can be, for example, a Hall-effect current sensor, a magnetoresistive sensor, a sense resistor connected to an amplifier, or a current clamp.

It should be appreciated that while the motor 140 is described as an electrical machine that can receive electrical power to produce mechanical power, it can also be used such that it receives mechanical power and thereby converts that to electrical power. In such a configuration, the inverter 120 can be utilized to excite the winding using a proper control and thereafter extract electrical power from the motor 140 while the motor 140 is receiving mechanical power.

Figure 2:
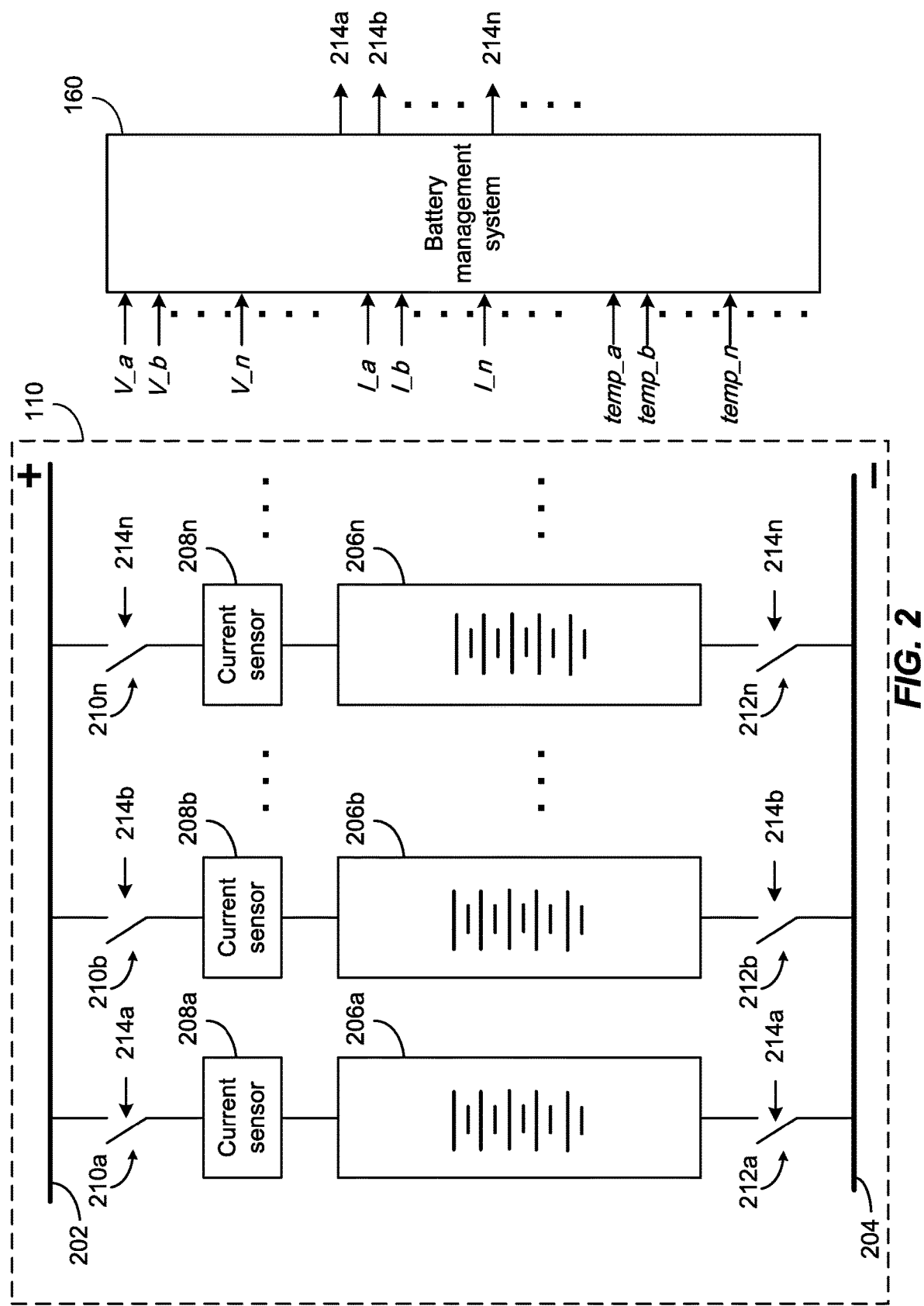
FIG. 2 is a block diagram of an example voltage source and battery management system according to one embodiment.

FIG. 2 is a block diagram of an example voltage source according to one embodiment. The voltage source 110 can include a plurality of battery strings 206a, 206b, . . . , 206n, . . . , individually or collectively referred to herein as the battery string(s) 206, and a plurality of string current sensors 208a, 208b, . . . , 208n, . . . , individually or collectively referred to herein as the string current sensor(s) 208. The battery strings 206 can be individually connected to or disconnected from a positive or high power bus 202 and a negative or low power bus 204 through a plurality of string switches 210a, 210b, . . . , 210n, . . . , and 212a, 212b, . . . , 212n, . . . , individually or collectively called the string switches 210 and 212. The string switches 210 and 212 can be controlled by control signals from the battery management system 160. The battery management system 160 can receive, among others, voltages, V_a, V_b, . . . , V_n, . . . , which can be output voltages across the respective battery strings 206a, 206b, . . . , 206n, . . . , determined using, for example a plurality of sensors and/or amplifiers (not shown). The battery management system 160 can also receive currents, I_a, I_b, . . . , I_n, . . . , which are currents from the respective battery strings 206a, 206b, . . . , 206n, . . . , measured by the respective string current sensors 208a, 208b, . . . , 208n, . . . . The battery management system 160 also can receive temperature measurements, temp_a, temp_b, . . . , temp_n, . . . , which are one or more of temperature measurements from the respective battery strings 206a, 206b, . . . 206n, . . . , measured by one or more temperature sensors (not shown) accompanying the battery strings. Based at least in part on the voltages, V_a, V_b, . . . , V_n, . . . , currents, I_a, I_b, . . . , I_n, . . . , and/or temperatures, temp_a, temp_b, . . . , temp_n, . . . , of the respective battery strings 206, the battery management system 160 can generate control signals 214a, 214b, . . . , 214n, . . . , individually or collectively referred to herein as the control signal(s) 214, for controlling the respective switches 210 and 212. As further described below, in addition to or instead of voltage, current, and/or temperature data of the battery strings 206, the battery management system 160 may receive respective voltage, current, and/or temperature data of subsets or parts, such as modules, bricks, and/or cells, of each of the battery strings 206. Further details of the battery management system 160 are discussed below in connection with FIG. 3 below.

The battery strings 206 can include a plurality of modules, each of which in turn can include a plurality of bricks and/or cells. Within each battery string 206, the constituent modules, bricks, and/or cells can be connected in series as symbolically depicted in FIG. 2. In some embodiments, the battery or voltage source 110 can include six battery strings 206 that can be connected to or disconnected from the power buses 202, 204. In some embodiments, each of the battery strings 206 can include a plurality of battery modules connected in series, and further details of the subsets of the battery 110 are discussed in connection with FIG. 3 below. The battery strings 206 and their subsets can be implemented with various different types of rechargeable batteries made of various materials, such as lead acid, nickel cadmium, lithium ion, or other suitable materials. In some embodiments, each of the battery strings can output about 375 V to 400 V if charged about 80% or more.

The string current sensors 208 can be connected in series with the respective battery strings 206 between the high and low power buses 202, 204. As shown in FIG. 2 the string current sensor 208 can be connected to the positive side of the respective battery strings 206 to measure the current discharged from the battery strings 206. In other embodiments, the string current sensors 208 can be connected to the battery strings 206 otherwise to measure the current flow due to discharging of the battery strings 206. The string current sensors 208, for example, can be implemented with any suitable current sensors, such as Hall-effect sensors and/or magnetoresistive sensors.

The string switches 210 and 212 can be contactors configured to connect the battery strings 206 to the power buses 202, 204 or disconnect the battery strings 206 from the power buses 202, 204 in response to the respective control signals 214. The switches 210 can be implemented with any suitable contactors capable of handling the level of current and voltage as needed in connection with, for example, the battery strings 206, the power buses 202, 204, and the mechanical load 150 (FIG. 1) within the electric vehicle drive system 100 (FIG. 1). In some embodiments the string switches 210 and 212 can be implemented with mechanical contactors with solenoid inside. In some embodiments, the string switches 210 can be powered by one or more drivers in the battery management system 160. Although in the illustrated example in FIG. 2, the string switches 210 (e.g., 210n) and the string switches 212 (e.g., 212n) are controlled by the same respective control signals 214 (e.g., 214n), in other embodiments, the string switches 210 (e.g., 210n) can be controlled by respective positive bus connect control signals while the string switches 212 (e.g., 212n) can be controlled by respective negative bus connect control signals.

The battery management system 160 can include a plurality of passive and/or active circuit elements, signal processing components, such as analog-to-digital converters (ADCs), amplifiers, buffers, drivers, regulators, or other suitable components. In some embodiments, the battery management system 160 can also include one or more processors to process incoming data to generate outputs, such as the control signals 214. In some embodiments, the battery management system 160 can also include one or more components for communicating and sending and receiving data within the battery management system 160 and/or with other components or circuitries in the electric vehicle. For example, the various components and circuits within the system 100, including components in the battery management system 160 can be in communication with one another using protocols or interfaces such as a controller area network (CAN) bus, serial peripheral interface (SPI), or other suitable protocols or interfaces. And in some embodiments, the processing of incoming data can be at least in part performed by other components not in the battery management system 160 within the electric vehicle as the battery management system 160 communicates with other components.

Figure 3:
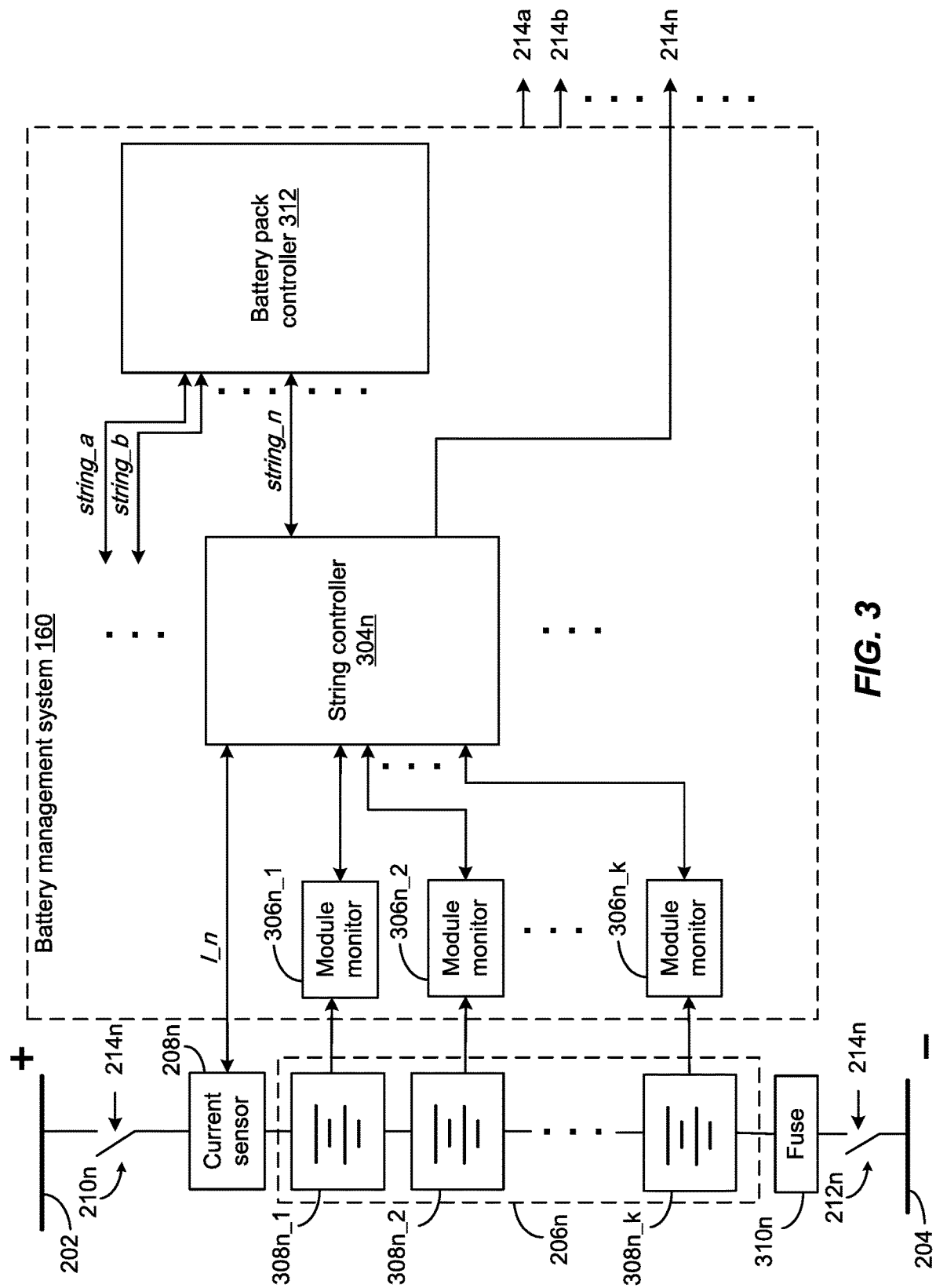
FIG. 3 is another block diagram of an example voltage source and battery management system according to one embodiment.

FIG. 3 is another block diagram of example voltage source and battery management system according to one embodiment. In FIG. 3, one exemplary battery string 206n of the plurality of battery strings 206 of FIG. 2 is illustrated, and accordingly, the corresponding string current sensor 208n, string switches 210n, 212n, and control signal 214n are illustrated. Also illustrated is a string fuse 310n coupled to the battery string 206n, and although not illustrated, the battery strings 206a, 206b, ..., 206n, ... in FIG. 2 may each also have a corresponding fuse 310a, 310b, ..., 310n, ... respectively. The battery string 206n includes a plurality of battery modules 308n_1, 308n_2, ..., 308n_k, individually or collectively referred to herein as the battery modules 308n for the battery string 206n, each sending battery module telemetry data to respective module monitors 306n_1, 306n_2, ..., 306n_k, individually or collectively referred to herein as the module monitors 306n for the battery string 206n, of the battery management system 160. The battery management system 160 includes a string controller 304n for the battery string 206n in communication with the battery modules 308n_1, 308n_2, ..., 308n_k for the battery string 206n. The string controller 304n can be implemented with one or more components and may include control circuit(s), processor(s), and/or transceiver(s) for receiving, processing, and/or sending data regarding the battery string 206n and/or control signals (e.g., 214n) and communicating with other parts of the battery management system 160, such as a battery pack controller 312.

Although not illustrated, the battery management system 160 also may include respective string controllers 304a, 304b, ..., 304n, ..., individually or collectively referred to herein as the string controller(s) 304, for the plurality of battery strings 206a, 206b, ..., 206n, ... illustrated in FIG. 2. The battery management system 160 also includes the battery pack controller 312, which is in communication with the plurality of string controllers 304. The battery pack controller 312 can, for example, be implemented with one or more components, such as a processor or microcontroller. In some embodiments, the battery management system 160 can also include an analog-to-digital converter (ADC) internal or external to one or more controllers, such as one or more processors of the string controller 304 and/or the battery back controller 312, for processing analog data.

In the illustrated embodiment, the nth battery string 206n has k number of battery modules 308n and k number of module monitors 306n_1, 306n2, ..., 306n_k. In some embodiments, one battery string 206 may include, for example, 6 battery modules 308 in series. In some embodiments, one battery module 308 may include, for example, 16 battery bricks in series, and a battery brick may include 13 battery cells in parallel. Also, in some embodiments the voltage source 110 (FIG. 1) of the electric vehicle drive system 100 (FIG. 1) can include one battery pack, which includes, for example, 6 battery strings 206. A battery cell can be, for example, a Li-ion cell, and the battery pack for the electric vehicle drive system 100 can provide power greater than, for example, 500 kW.

The module monitors 306n are configured to monitor status of the battery modules 308n and the battery string 206n by gathering data regarding voltage and temperature of the battery modules 308n. In the illustrated embodiment, the module monitors 306n are in serial or point-to-point communication with the main controller 305n of the string control unit 304n. In some embodiments, the module monitors 306n can communicate with the main controller 305n using one or more suitable communication protocols, such as CAN, SPI, universal synchronous asynchronous receiver transmitter (USART), universal asynchronous receiver transmitter (UART), etc. In other embodiments, the multiple subsidiary units (i.e., the module monitors 306n) can be in communication in a daisy-chained manner.

In some embodiments, each of the battery modules 308 can be enclosed in an individual housing or module enclosure, and the enclosures for the battery modules 308 can each also enclose the module monitor 306 associated with the respective battery modules 308. Each of the enclosures also can include additional circuits, components, materials, or other features accompanying the battery module 308. For example, each of the enclosures may include liquid coolant for the enclosed battery module 308. Further details of the battery module 308, module enclosures, and module communications are discussed in connection with FIGS. 5-8 below.

The battery pack controller 312 in the illustrated embodiment can be in communication with the plurality of string controller 304a, 304b, . . . , 304n, . . . . In some embodiments, various data from the one or more of the battery strings (e.g., string_a, string_b, . . . , string_n, . . . ) can be communicated using CAN bus and the battery management system 160 may include a plurality of CAN bus transceivers (not shown). The battery pack controller 312 can be in further communication with other devices, components, or modules of the electric vehicle. In certain instances, the battery pack controller 312 can communicate to components such as a switch driver, to cut power and disconnect all the switches 210 and 212, for example, in case of an air bag deployment.

Figure 4:
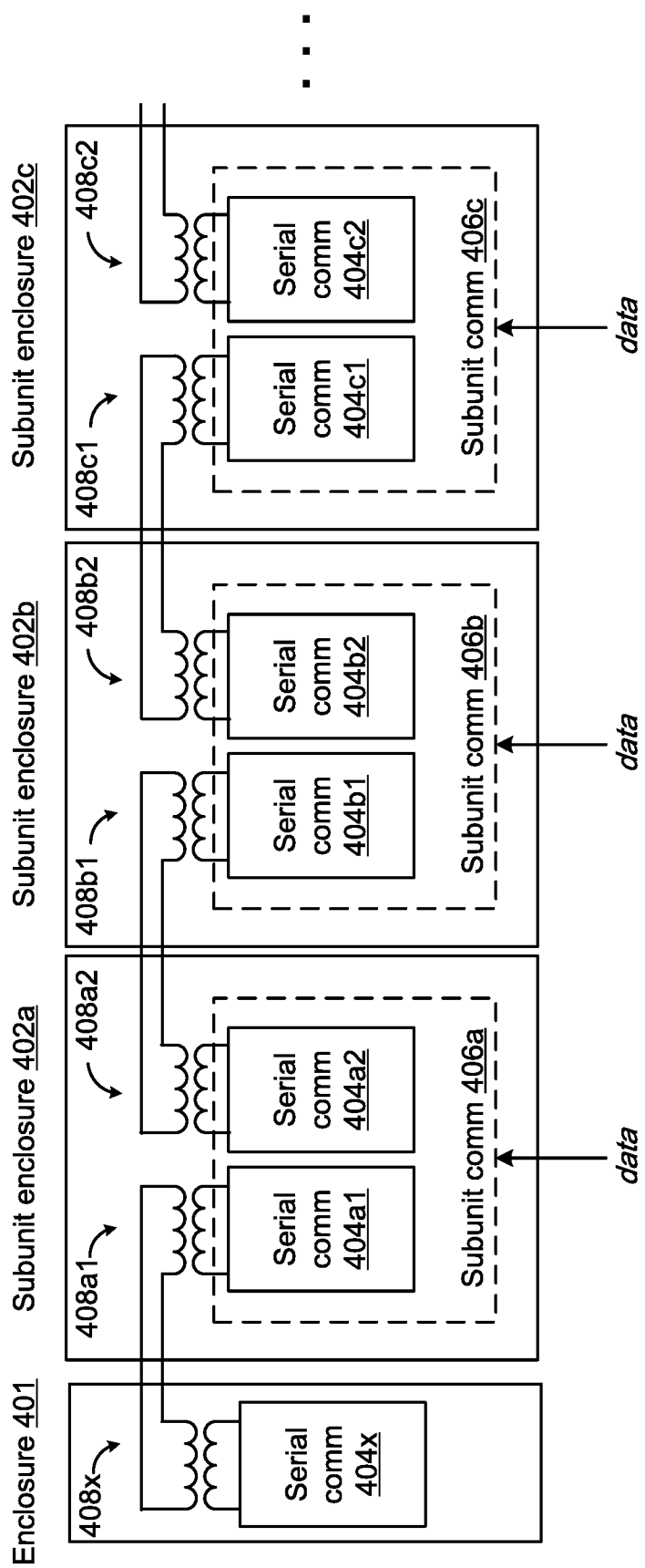
FIG. 4 is a block diagram of an example data communication system.

FIG. 4 is a block diagram of a typical example data communication system having multiple subunits. The illustrated example data communication system includes subunit enclosures, 402a, 402b, 402c, . . . , individually or collectively referred to herein as the subunit enclosure(s) 402, and the subunit enclosures 402 have respective subunit communication circuits, 406a, 406b, 406c, . . . , individually or collectively referred to herein as the subunit communication circuit(s) 406. Each of the subunit communication circuits 406 can have one or more serial communicators, 404a1, 404a2, 404b1, 404b2, 404c1, 404c2, . . . , individually or collectively referred to herein as the serial communicator(s) 404. The illustrated example includes an enclosure 401, similar to the enclosures 402, and the enclosure contains a serial communicator 404x, similar to the serial communicators 404. The serial communicator 404x can be in communication with other serial communicators 404. The serial communicators 404 can be implemented with SPI devices such as isoSPI transceivers.

Each of the serial communicators 404 illustrated in FIG. 4 is coupled to a transformer fully enclosed in each of the subunit enclosures 402. The serial communicator 404a1 is coupled to a transformer 408a1, and the serial communicator 404a2 is coupled to a transformer 408a2, where both of the transformers 408a1, 408a2 are enclosed in the subunit enclosure 402a. Similarly, the serial communicator 404b1 is coupled to a transformer 408b1, and the serial communicator 404b2 is coupled to a transformer 408b2, where both of the transformers 408a1, 408a2 are enclosed in the subunit enclosure 402b. Also, the serial communicator 404c1 is coupled to a transformer 408c1, and the serial communicator 404c2 is coupled to a transformer 408c2, where both of the transformers 408c1, 408c2 are enclosed in the subunit enclosure 402c. Similarly, the serial communicator 404x is coupled to a transformer 408x. The transformers 408x, 408a1, 408a2, 408b1, 408b2, 408c1, 408c2, . . . are individually or collectively referred therein as the transformer(s) 408. The illustrated system in FIG. 4 can include more or less subunit enclosures 402, each of which encloses one or more transformers 408. It is to be noted that polarity of the transformers 408 is not shown in FIG. 4, and although illustrated with straight lines, the connections between the transformers 408 can be implemented with twisted pair of wires. Although not illustrated, the subunit communication circuits 406 may be in further communication with other circuits or elements, such as sensors, to gather data to be communicated.

The data communication system illustrated in FIG. 4 shows how the serial communicators 404 of different subunit enclosures 402 can typically be configured and in communication. As shown in FIG. 4, a full transformer (e.g., 408a2) within a subunit enclosure (e.g., 402a) can be coupled to another full transformer (e.g., 408b1) within another subunit enclosure (e.g., 402b) to communicate serial data. The transformers 408 can be implemented in one device, such as an integrated circuit (IC) chip or a fully-contained (containing both coils of the transformer) circuit, coupled to the respective serial communicators 404. As such, the transformer, e.g., 408a2, and the another transformer, e.g., 408b1, can be connected with wires, such as twisted pair of wires, through their respective subunit enclosures, e.g., 402a, 402b. The subunit enclosures 402 can be distributed throughout a system, such as an electric vehicle, to gather data from various subsystems within the larger system. However, in this typical implementation, the subunit enclosure, e.g., 402a, and the subunit enclosure, e.g., 402b, need to be punctured or pierced to allow the wire connections between the transformers, e.g., 408a2, 408b1. Depending on the function or content of the subunit enclosures 402, the puncturing of the enclosures 402 may require particularized sealing or fixating techniques around the wires and may expose portions of the wires that go through the punctures to wear and tear.

Figure 5:
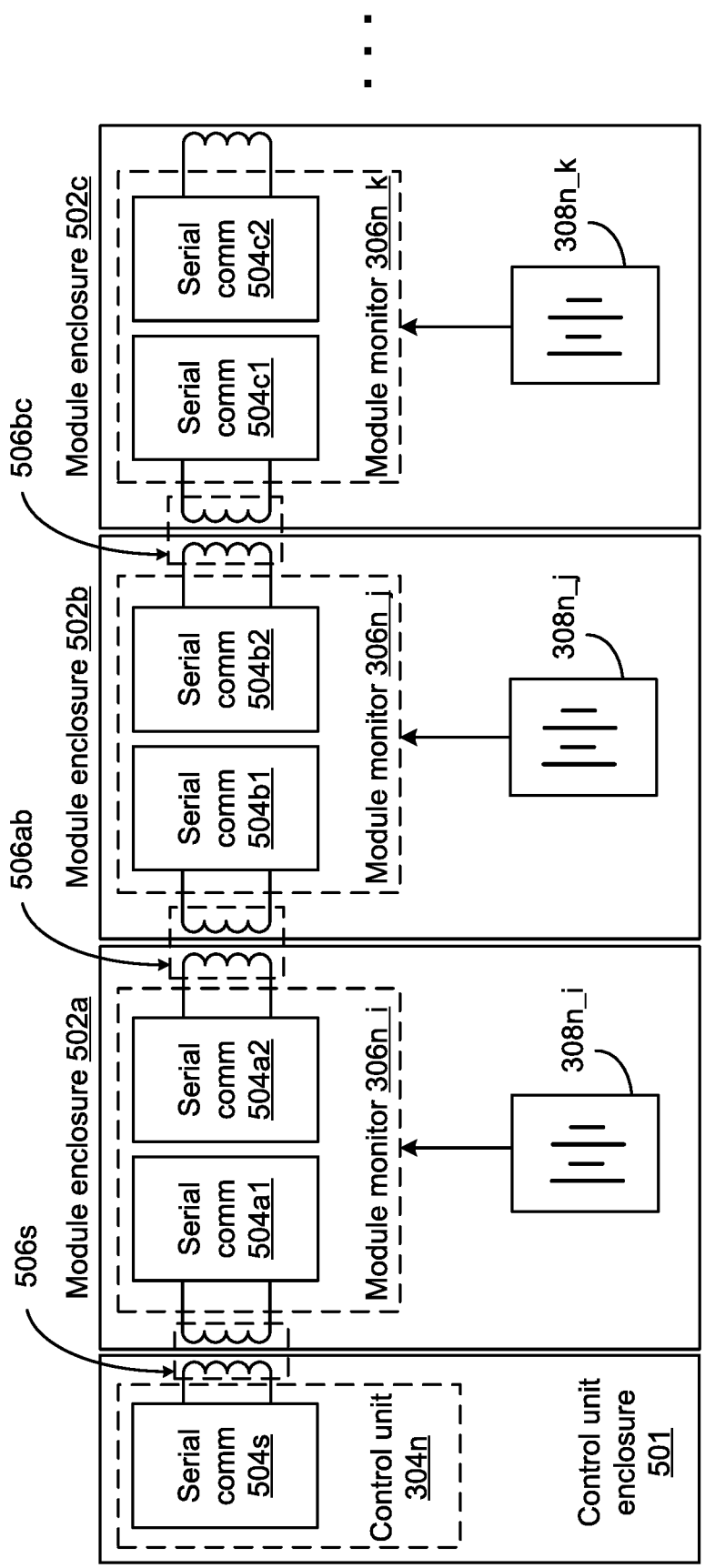
FIG. 5 is a block diagram of an example battery module data communication system according to one embodiment.

FIG. 5 is a block diagram of an example battery module data communication system according to one embodiment. The illustrated example data communication system in FIG. 5 includes module enclosures, or housings, 502a, 502b, 502c, . . . , individually or collectively referred to herein as the module enclosure(s) 502. Each of the module enclosures 502 contains one of the battery modules 308n of the nth battery string 206n discussed above in connection with FIG. 3. In this illustrated example, the module enclosures 502a, 502b, 502c, . . . , contains the battery modules 308n_i, 308n_j, 308n_k, . . . , respectively. The module enclosures 502 also contain the respective module monitors 306n_i, 306n_j, 306n_k, . . . , coupled to and configured to receive data from the respective battery modules 308n_i, 308n_j, 308n_k, . . . as discussed above in connection with FIG. 3. Also illustrated in this example is a string controller enclosure 501, which contains the string controller 304n discussed above in connection with FIG. 3. Each of the module monitors 306n includes one or more serial communicators, 504a1, 504a2, 504b1, 504b2, 504c1, 504c2, . . . , individually or collectively referred to herein as the serial communicators 504. Similarly, an overall control unit 304n includes a serial communicator 504s, which is in communication with other serial communicators 504 of the module monitors 306n. The serial communicators 504 of the control unit enclosure 501 and the module enclosures 502 are in communication with one another through transformers 506s, 506ab, 506bc, . . . , individually or collectively referred to herein as the transformers 506.

In some embodiments, the serial communicators 504 can be implemented with SPI devices such as isoSPI transceivers in, for example, a daisy chain configuration. Although isoSPI is one possible communication protocol, a variety of protocols may be used that have no DC component to the signal such that they can be coupled with transformers. It is to be noted that the battery module data communication system illustrated in FIG. 5 can include more or less module enclosures 502. In some embodiments, each of the battery modules 308*n* and each of their respective module monitors 306 of an electric vehicle can be contained in each of the respective module enclosures 502. For instance, an electric vehicle may have one battery pack having six battery strings 206 (FIGS. 2-3), and each battery string 206 may include six battery modules 308 (FIGS. 3, 5). In such example, the electric car would have 36 total battery modules 308, and correspondingly, 36 total battery module enclosures 502.

Each of the module enclosures 502 contains parts of the full transformers 506. For example, the module enclosure 502*a* contains one coil, either primary or secondary winding, of the transformer 506*ab*, and the module enclosure 502*b* contains the other one coil, either secondary or primary winding, of the transformer 506*ab*. Similarly, the module enclosure 502*b* contains one coil, either primary or secondary winding, of the transformer 506*bc*, and the module enclosure 502*c* contains the other coil, either secondary or primary winding, of the transformer 506*bc*. The module enclosure 502 can be made of materials such as plastic or any other suitable materials depending on the function and content of the module enclosure 502.

As further illustrated in and described in connection with FIGS. 6-8 below, having parts of the transformers 506 contained within each of the module enclosures 502 may advantageously reduce or eliminate the need to puncture holes on the module enclosures 502 to allow the data communication between the module monitors 306*n*. It is to be noted that the polarity of the transformers 506 is not shown in FIG. 5, and the polarity of the transformers 506 can be adjusted or configured through different windings, which are illustrated in FIGS. 6-8 below.

Figure 6:
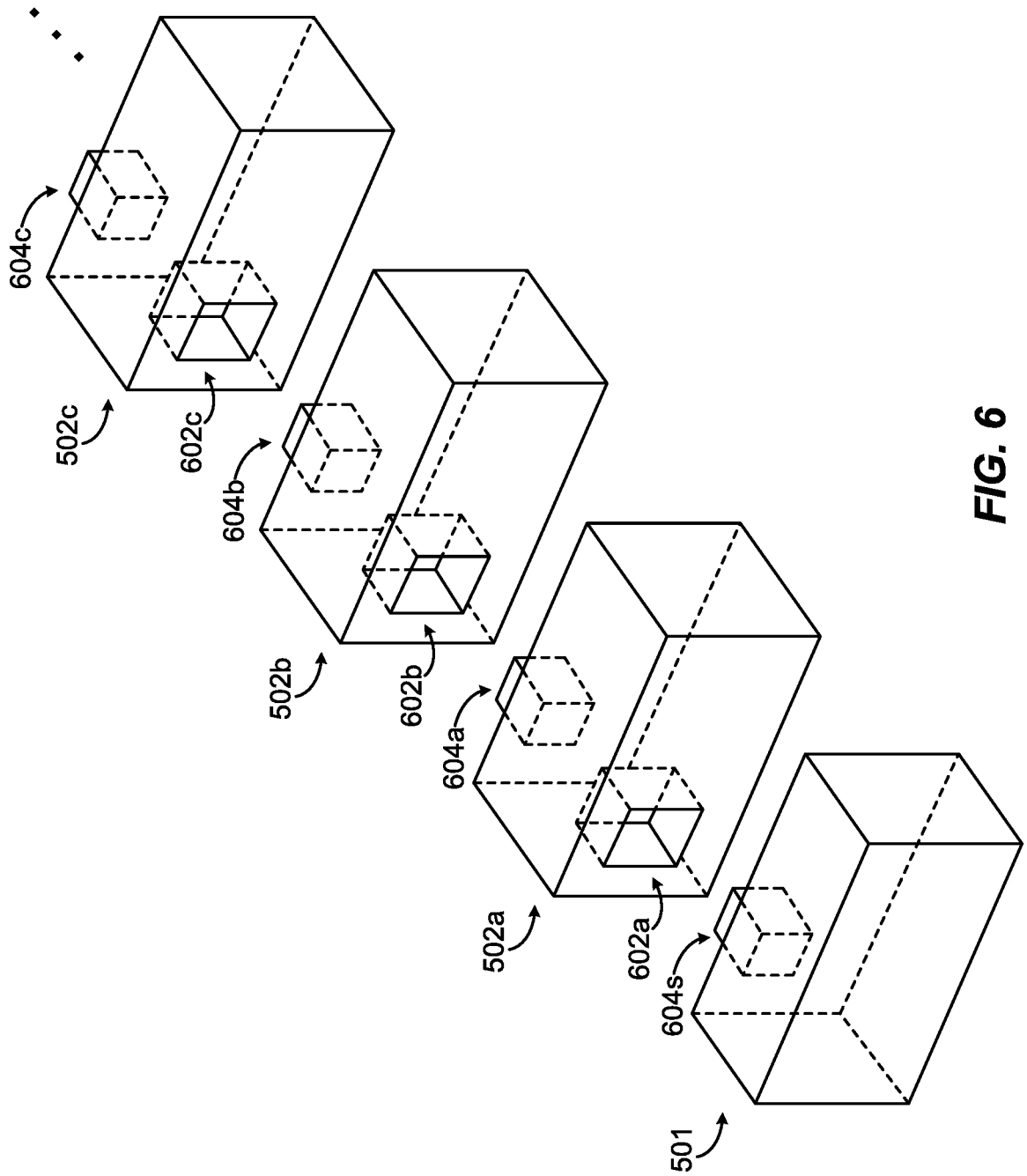
FIG. 6 is a perspective view of example battery module housings according to one embodiment.

FIG. 6 is a perspective view of example battery module housings according to one embodiment. FIG. 6 illustrates the battery module enclosures 502 discussed above in connection with FIG. 5 in a three dimensional view. Each of the control unit enclosure 501 and the battery module enclosures 502 has one or more inter-module or inter-housing interfaces, or coil interfaces 604*s*, 602*a*, 604*a*, 602*b*, 604*b*, 602*c*, 604*c* formed. It is to be noted that there can be more interfaces in some embodiments as there can be more module housings. As illustrated in FIG. 6, the interfaces 604*s*, 602*a*, 604*a*, 602*b*, 604*b*, 602*c*, 604*c* can be complementary to one another, allowing engaging one interface to another. For example, the interface 604*a* is a plug interface, and the interface 602*b* is a receptacle interface, such that the interface 604*a* can be plugged into the interface 602*b* as the module enclosures 502*a* and 502*b* are placed next to each other. Similarly, the interface 604*b* is a plug and the interface 602*c* is a receptacle so that the interfaces 604*b* and 602*c* can be engaged. In other embodiments, the inter-module interfaces (e.g., 602, 604) can be implemented with hybrid interfaces, each having a plug-like (protruding) portion and a receptacle-like (receding) portion. In some embodiments, an electric vehicle may have six battery strings 206 (FIGS. 2-3), each having six battery modules 308 (FIGS. 3, 5). In such embodiments, there can be six battery module enclosures 502 placed next to one another with their respective interfaces engaged. It is to be noted that the interfaces 602, 604 need not be on the opposing sides of the module enclosures 502 as different arrangements of placing the module enclosures 502 can be employed in other embodiments. Also, it is to be noted that in some embodiments, the first and last of the battery module enclosures 502 may not have the extra unengaged interface (602 or 604). As further illustrated in connection with FIGS. 7-8, each of the interfaces 604*s*, 602*a*, 604*a*, 602*b*, 604*b*, 602*c*, 604*c* contains a coil of a transformer, such as the transformer 506*ab*, 506*bc* (FIG. 5) such that engaging two complementary interfaces (e.g., 604*a* and 602*b*) can form a full transformer (e.g., 506*ab*).

Figure 7:
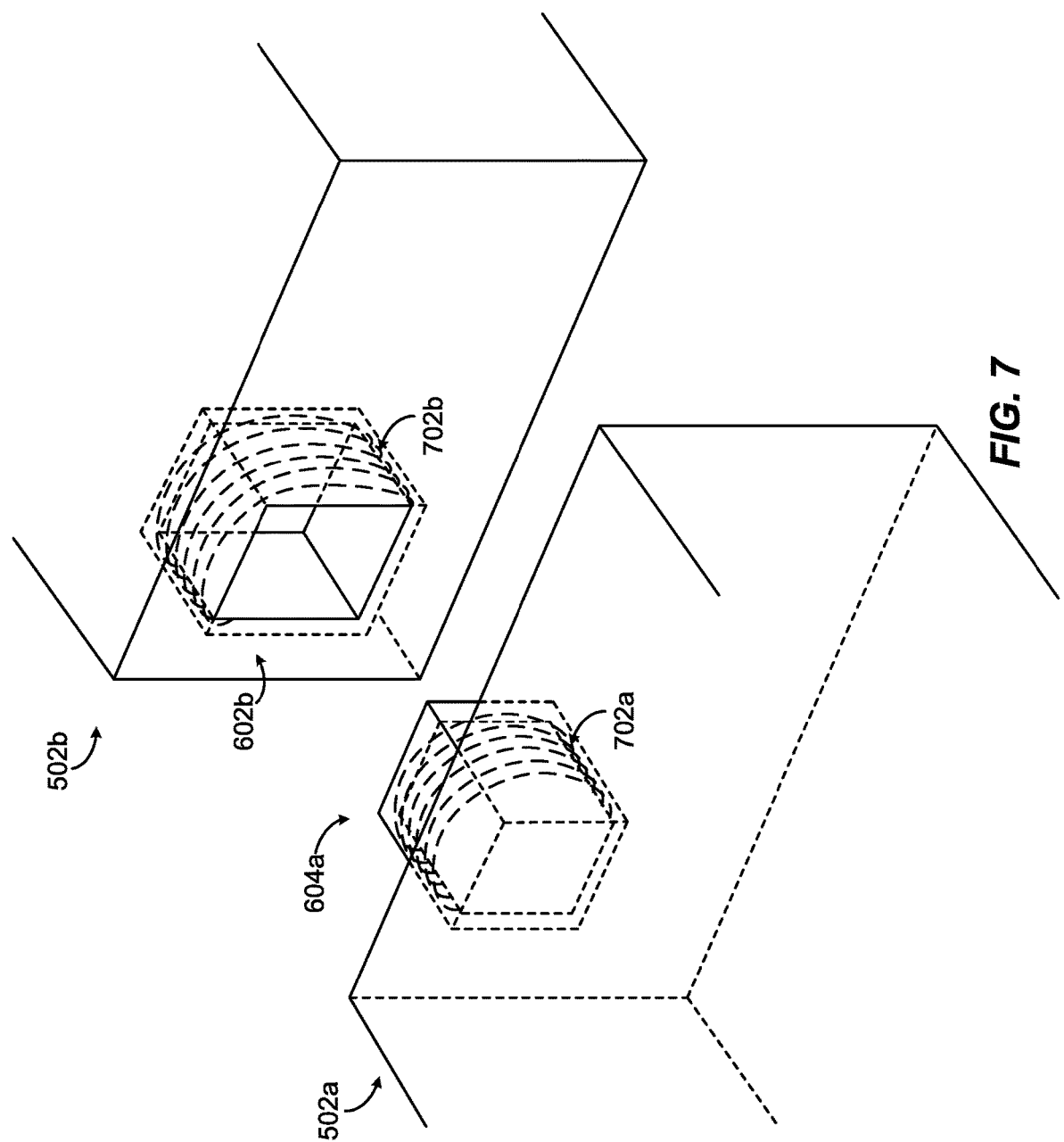
FIG. 7 is a perspective view of example interfaces for a transformer according to one embodiment.

FIG. 7 is a perspective view of example interfaces for a transformer according to one embodiment. In the illustrated example of FIG. 7, a coil is proximate and inside the module enclosure 502*a* having the plug interface 604*a*, and another coil is proximate and inside the module enclosure 502*b* having the receptacle interface 602*b*. When the module enclosure 502*a* is placed adjacent to the module enclosure 502*b*, the plug interface 604*a* and the receptacle interface 602*b* can be engaged and their respective coils 702*a*, 702*b* can form the full transformer 506*ab* (FIG. 5) having the primary and secondary windings configured concentrically. In the illustrated example, one of the coils 702*a*, 702*b* can be configured as the primary winding and the other the secondary winding of the transformer 506*ab*. In this example, the coil 702*a* of the transformer 506*ab* is coupled to the serial communicator 504*a*2 (FIG. 5) and the coil 702*b* of the transformer 506*ab* is coupled to the serial communicator 504*b*1 (FIG. 5). Although in this example illustrated in FIG. 7 the transformer 506 is a shell-type transformer having concentric primary and secondary windings, in other embodiments, the transformer 506 can be implemented with a core-type transformer having side-by-side primary and secondary windings. In such embodiments, a plug-receptacle hybrid interface can be employed to keep one coil of a transformer enclosed inside one enclosure and the other coil of the transformer enclosed inside the next enclosure. Further details of the transformer are discussed in connection with FIG. 8 below.

Figure 8:
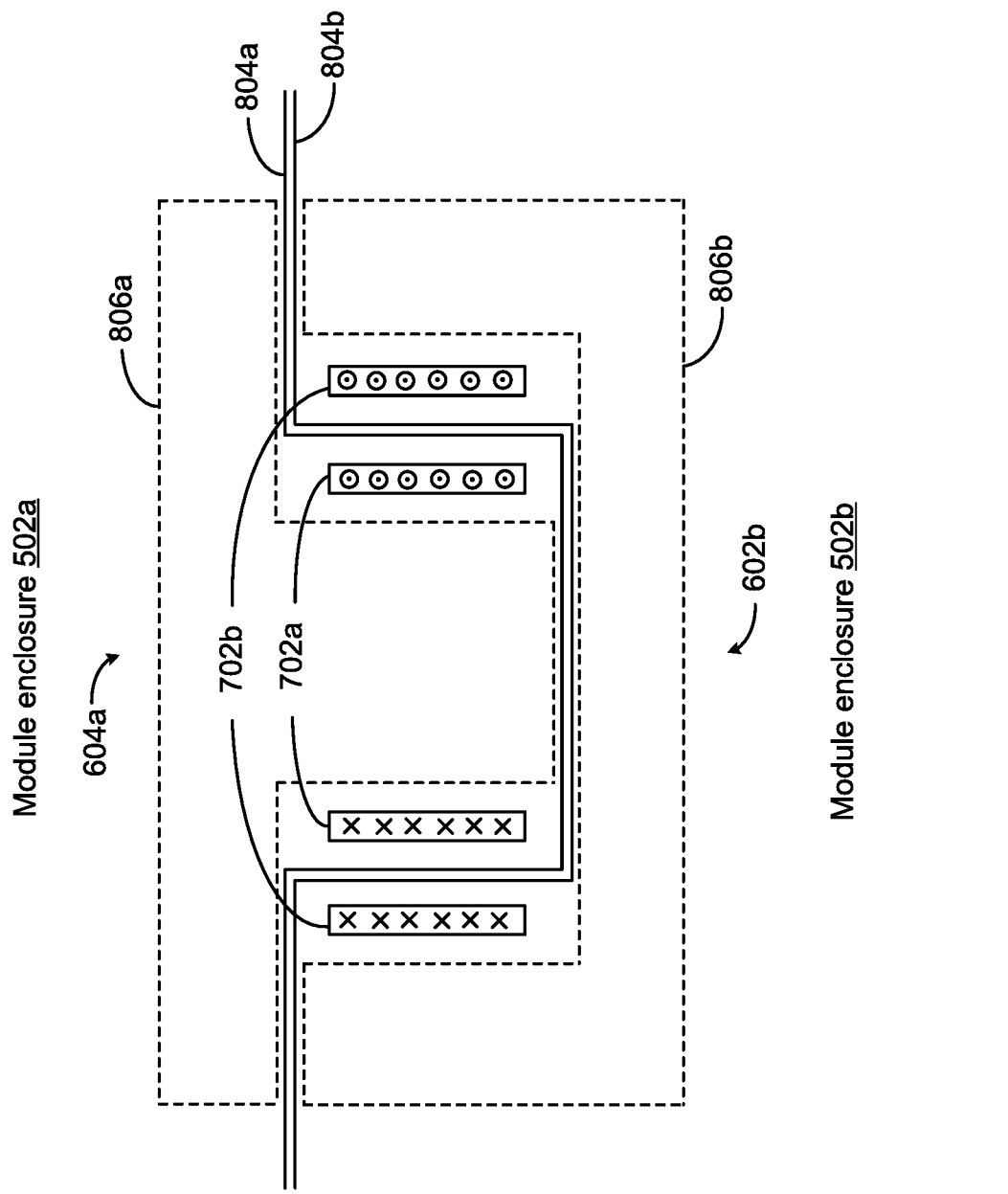
FIG. 8 is a cross-sectional view of example engaged interfaces for a transformer according to one embodiment.

FIG. 8 is a cross-sectional view of example engaged interfaces for a transformer according to one embodiment. FIG. 8 illustrates the interface 604*a* of the module enclosure 502*a* and the interface 602*b* of the module enclosure 502*b* being engaged to each other. The interface 604*a*, having a surface 804*a*, contains the coil 702*a*, and the interface 602*b*, having a surface 804*b*, contains the coil 702*b*. Also illustrated in FIG. 8 are a partial core 806*a* inside the module enclosure 502*a* and a partial core 806*b* inside the module enclosure 502*b*.

The partial cores 806*a*, 806*b* form a core for a shell-type transformer (506*ab* in this example) when the interfaces 602*a*, 604*a* are engaged. In the illustrated example, the partial cores 806*a*, 806*b* put together form as close a full transformer core as possible with the exception of the small breaks along the interface surfaces 804*a*, 804*b*. In other embodiments, the core of the transformer can be a substantial or partial air core or a complete air core (i.e., no core), or an almost-full core with different air gaps or break planes along a complete core. In embodiments having core-type transformers having hybrid interfaces, the partial cores 806 or the respective module enclosures 502 can be two L-shaped partial cores forming a full rectangular transformer core when two of the partial cores are engaged. In different embodiments, various configurations (partial, air, different break planes) of the transformer core can be implemented depending on leakage, voltage level, core material permeability, and frequency of data transmission. The core materials can be selected depending on the data frequency of the communication (e.g., SPI or isoSPI) between the module monitors 306 (FIG. 3, 5) and the suitable level of permeability, with powdered ferrite material often suitable. It is to be noted that although the coils 702*a*, 702*b* in FIG. 8 show particular winding directions, different transformer polarities can be implemented in different embodiments, and in other embodiments, the directions of the windings can be otherwise than illustrated.

Additional transformer coils 702 and interfaces 602, 604 of the module enclosures 502 (e.g., 502c, 502d, ... ) can be similarly implemented as described in connection with FIGS. 7-8 according to the similar teachings and principles.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment (assuming that the functionality of the depicted circuits is not adversely affected).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the implementations are not limited to the precise configuration and components illustrated above. Various modifications, changes and variations may be made in the arrangement, operation and details of the methods and apparatus described above without departing from the scope of the implementations.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well.

What is claimed is:

1. An electric vehicle comprising:
   a first battery module in a first housing;
   a second battery module in a second housing;
   a first coil proximate to and inside of the first housing; and
      a second coil proximate to and inside of the second housing,
   wherein the first coil forms a primary winding of a transformer and the second coil forms a secondary winding of the transformer;
   a third coil proximate to and inside of the second housing and coupled to the second communication circuit;
   a third battery module in a third housing;
   a fourth coil proximate to and inside of a third housing; and
   a third communication circuit coupled to the third battery module and the fourth coil,
   wherein the third coil forms a primary winding of another transformer and the fourth coil forms a secondary winding of the another transformer.

2. The electric vehicle of claim 1 further comprising: a first coil interface containing the first coil; and a second coil interface containing the second coil.

3. The electric vehicle of claim 2, wherein the first coil interface is a plug, and wherein the second coil interface is a receptacle.

4. The electric vehicle of claim 1 further comprising:
   a first communication circuit coupled to the first battery module and the first coil; and
   a second communication circuit coupled to the second battery module and the second coil.

5. The electric vehicle of claim 4, wherein the first communication circuit and the second communication circuit are in communication with each other using a serial peripheral interface (SPI) protocol.

6. The electric vehicle of claim 1, wherein the first, second, and third communication circuit is in communication with one another in a daisy chain configuration.

7. An electric vehicle comprising a plurality of battery modules each in respective plurality of housings, wherein each of the plurality of housings includes at least one coil forming either a primary winding or a secondary winding of a transformer, wherein the plurality of housings are placed adjacent to one another so as to form a plurality of transformers from the respective coils of the adjacent housings;
   wherein the plurality of transformers are configured to transfer data regarding respective battery modules of the respective housings;
   wherein each of the plurality of housings includes at least one communication circuit, wherein each of the communication circuits is coupled with the at least one coil included in the respective housing; and
   wherein the at least one communication circuit is in communication with at least one processor configured to receive the data from the plurality of battery modules.

8. The electric vehicle of claim 7, wherein the data regarding respective battery modules are transferred without a wire hole on the housings.

9. The electric vehicle of claim 7, wherein the plurality of communication circuits are configured to communicate data using a serial peripheral interface (SPI) protocol.

10. The electric vehicle of claim 7, wherein the plurality of communication circuits are in communication with one another in a daisy chain configuration.

11. The electric vehicle of claim 7, wherein the coils of the adjacent housings form the plurality of transformers through inter-housing interfaces, wherein each of the inter-housing interfaces comprises a plug or a receptacle.

12. A method of making one or more communication links between a plurality of housings each containing a battery module, the method comprising:
   forming at least first interface associated with a coil for at least one of the plurality of housings;
   forming at least second interface associated with a coil for at least another one of the plurality of housings; and engaging the at least first interface and the at least second interface of the different housings to form at least one transformer;
   forming both a plug interface and a receptacle interface for at least one of the plurality of housings;
   wherein engaging the at least first interface and the at least second interface comprises placing three or more of the plurality of housings adjacent to one another, wherein the transformers formed by the first and second interfaces provide communication links between the three or more adjacent housings.

13. The method of claim 12 wherein the at least first interface comprises a plug interface, and wherein the at least second interface comprises a receptacle interface.

14. The method of claim 12, wherein the communication links are configured to transfer data using a serial peripheral interface (SPI) protocol in a daisy chain configuration.

* * * * *